United States Patent [19]

Homes

[11] 3,753,525
[45] Aug. 21, 1973

[54] PIPE WORKING CARRIAGE
[75] Inventor: Samuel J. Homes, Houston, Tex.
[73] Assignee: Crc-Crose International, Inc., Houston, Tex.
[22] Filed: Aug. 2, 1971
[21] Appl. No.: 168,169

[52] U.S. Cl. .................... 228/29, 29/484, 219/59, 228/32
[51] Int. Cl. ............................................ B23k 5/00
[58] Field of Search ................... 228/25, 29, 32, 45; 266/23; 219/59, 68; 198/184, 193; 29/484

[56] References Cited
UNITED STATES PATENTS

| | | | |
|---|---|---|---|
| 3,441,191 | 4/1969 | Cerneau | 228/32 |
| 3,268,707 | 8/1966 | Thomas | 219/125 R |
| 3,266,701 | 8/1966 | Peignen | 228/29 |
| 3,084,246 | 4/1963 | Ruppel et al. | 219/125 R |
| 2,941,067 | 6/1960 | Kitrell | 219/125 R |
| 2,596,322 | 5/1952 | Zumwalt | 228/32 X |
| 2,466,143 | 4/1949 | Young | 228/32 X |

Primary Examiner—J. Spencer Overholser
Assistant Examiner—Robert J. Craig
Attorney—J. Vincent Martin, Jack R. Springgate et al.

[57] ABSTRACT

A pipe working carriage which is adapted to travel along a track encircling the exterior of a pipe. The carriage includes a body, wheels for engaging the track, and a drive system which engages a cylindrical surface parallel to the axis of the pipe. This abstract is neither intended to define the invention of the application, which of course is measured by the claims, nor is it intended to be limiting as to the scope of the invention in any way.

12 Claims, 8 Drawing Figures

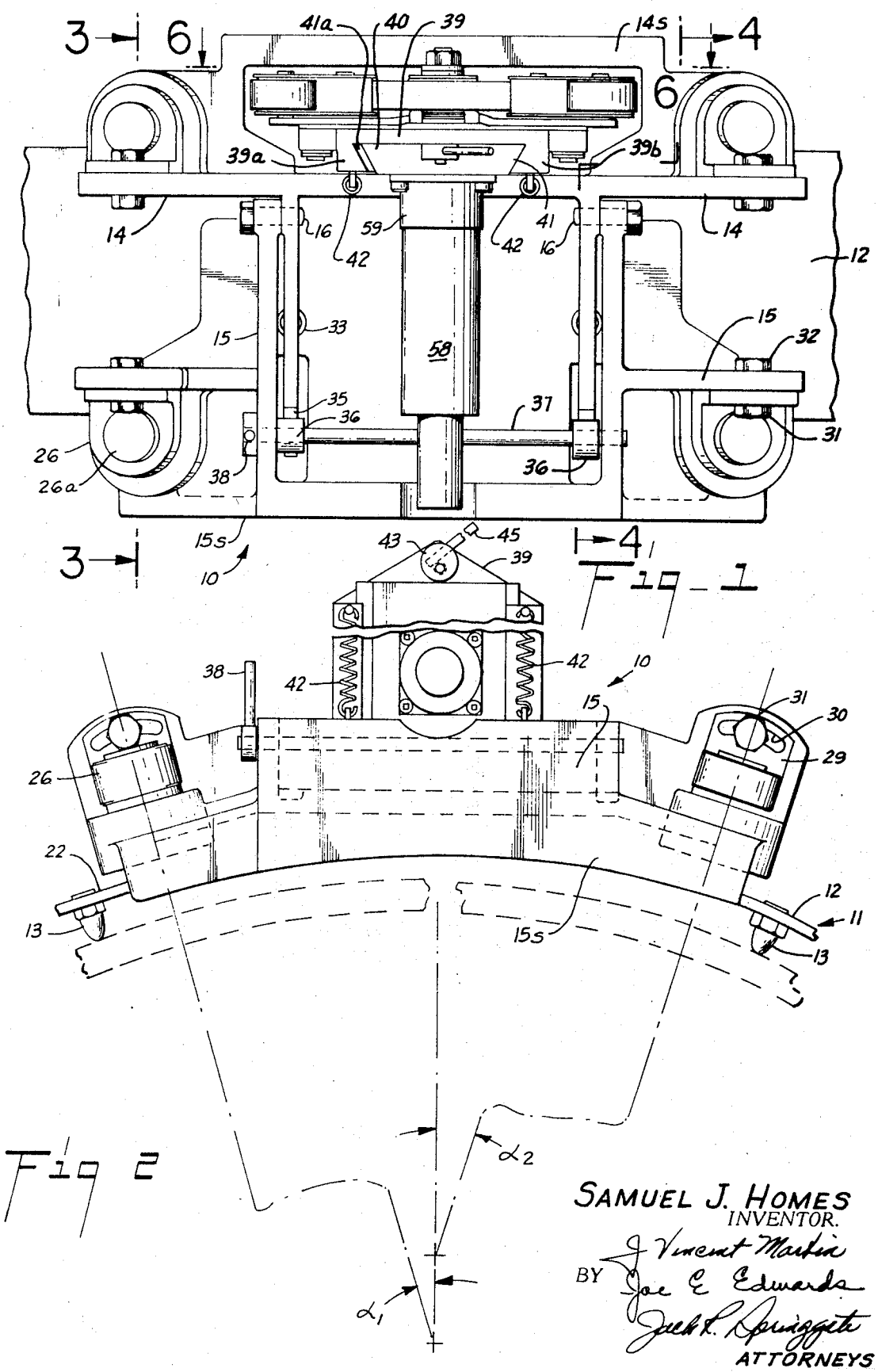

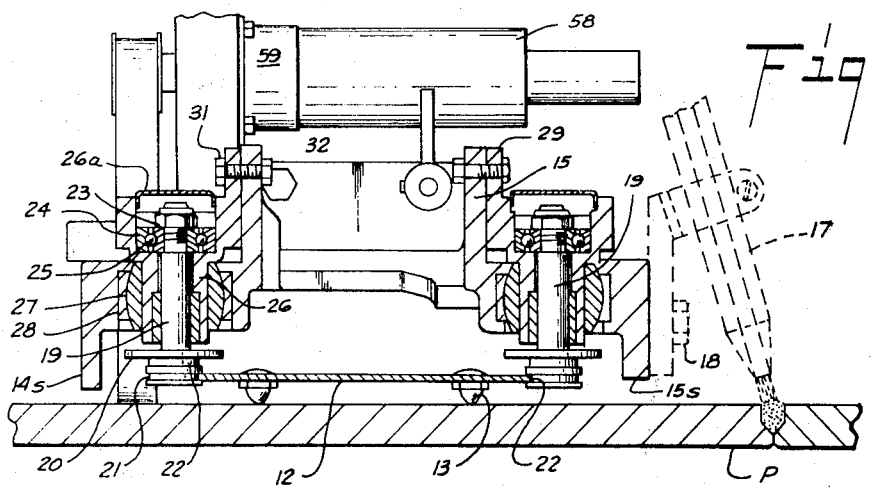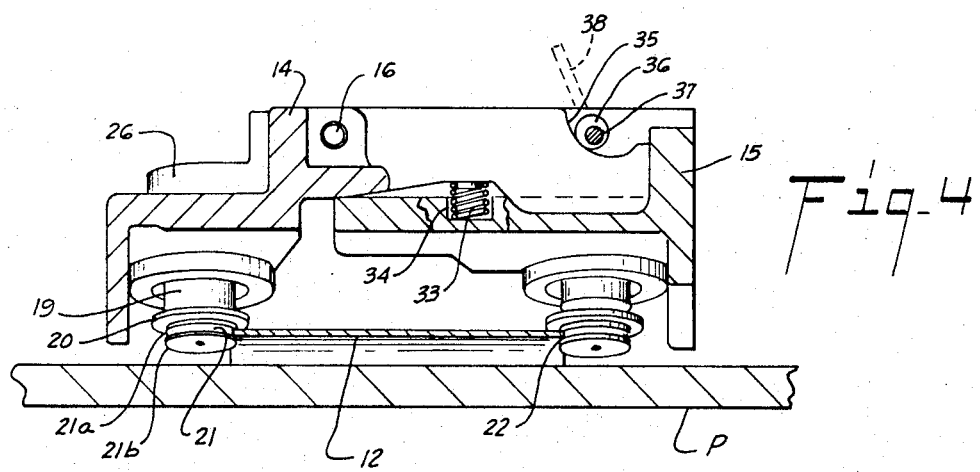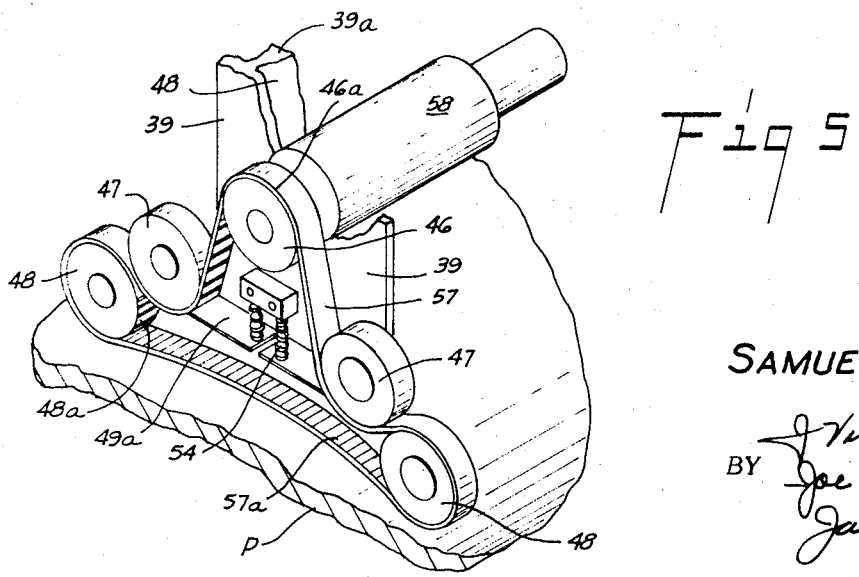

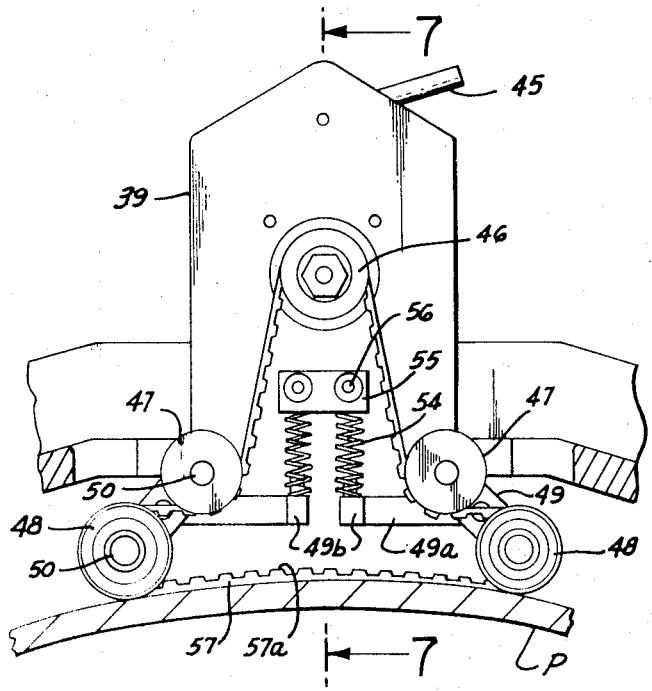
Fig-6
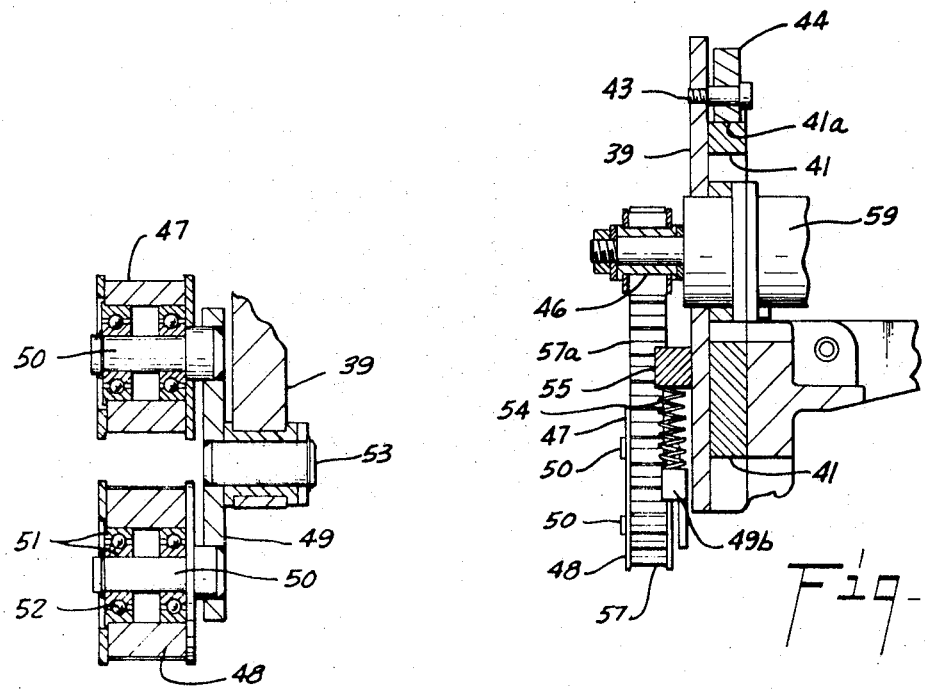
Fig-8
Fig-7
SAMUEL J. HOMES
INVENTOR.
BY *Vincent Martin*
*Joe E. Edwards*
*Jack R. Springgate*
ATTORNEYS

PIPE WORKING CARRIAGE

SUMMARY OF THE INVENTION

This invention relates to a pipe working carriage which is adapted to travel along a track circumferentially disposed about the exterior of a pipe while holding a tool, such as a cutting torch or welding apparatus, for performing work on the pipe such as beveling or welding. It relates particularly to such a carriage which is driven by direct engagement with a cylindrical surface parallel to the axis of the pipe, such as the exterior surface of the pipe or the top surface of the track.

Pipelines for the carrying of gas, oil or like fluids from one area to another are frequently constructed in large diameters such as from 12 inches to 36 inches, or larger, depending on he desired capacity. In constructing such pipelines, the usual practice is to lay the large diameter pipe sections end to end, and then weld the abutting ends together. In preparation for such welding, the abutting ends of each pipe are first prepared, as by beveling, so that a sound welded joint may be made. After the beveling operation, the ends are then joined by welding circumferentially around the pipe. The carrying out of such beveling and welding operations by hand is tedious and expensive, and frequently results in a poorer weld than could be achived using automatic beveling and welding machines. It has, therefore, been desirable to provide a portable beveling and welding machine which may be used in the field. Such a portable beveling machine is disclosed in U.S. Pat. No. 2,705,629 issued Apr. 5, 1955 to F. S. Miller. The machine there disclosed uses a flexible annular track band which is mounted circumferentially about the exterior of the pipe, and a powered carriage which engages the edges of the track and holds a cutting torch for cutting a bevel as the machine is moved about the track. As shown in FIGS. 4 and 5 of the Miller Patent, the carriage is mounted on the track by means of grooved wheels which engage the external edges of the track. These same wheels are used for locomotion; power means are provided for rotating the wheels on each side of the track in opposite directions so that the carriage will move along the track. A difficulty which has been encountered in the use of this device is a tendency on the part of the track band to buckle during use. This is due to the relatively thin, flexible track which is used and to the fact that the wheels on each side of the track tightly engage the track to provide the friction for driving the carriage. The result is a tight engagement which tends to buckle the track. It is, accordingly, a primary object of this invention to provide a pipe beveling and welding carriage which may be used with an annular track band and which overcomes the deformation problem of the prior art carriage.

Another object is to provide such a carriage wherein the drive mechanism operates by direct engagement with a circumferential surface parallel to the axis of the pipe rather than the edges of the track.

Another object is to provide such a carriage which improves over the prior art carriage by driving off the external surface of the pipe.

A more specific object is to provide such a carriage including resilient means in the drive system for accommodating irregularities in the external surface of the pipe, and for exerting constant pressure on the friction means which engage the pipe.

DESCRIPTION OF THE DRAWINGS AND THE PREFERRED EMBODIMENT

These and other objects and advantages of the invention will become apparent from the drawings, the specification and claims.

In the accompanying drawings, which illustrate the preferred embodiment of the invention, and wherein like numerals indicate like parts:

FIG. 1 is a top plan view of the preferred form of carriage, in accordance with the present invention, mounted on a section of track;

FIG. 2 is a view in side elevation, partly in phantom, of the carriage of FIG. 1;

FIG. 3 is a view in end elevation and in section taken along the line 3—3 of FIG. 1, showing in detail the means for mounting the carriage on the track;

FIG. 4 is a sectional view in elevation taken along line 4—4 of FIG. 1, showing the cam means for removing the carriage from the track;

FIG. 5 is a view in perspective, partly in section, of the drive system of the carriage of FIG. 1;

FIG. 6 is a side elevational view, partly in section, taken along line 6—6 of FIG. 1, and illustrating the drive system engaging the exterior surface of the pipe;

FIG. 7 is a view in sectional elevation, taken along line 7—7 of FIG. 6, illustrating details of the drive system; and FIG. 8 is an enlarged sectional detail taken along line 8—8 of FIG. 6, showing the idler roller mounting.

In FIGS. 1 and 2 is shown the carriage 10 mounted on a track 11. The track is preferably one such as that disclosed in the aforementioned Miller patent, and comprises a flexible metal band 12 having a plurality of spaced radially disposed and inwardly extending locating pins 13 which locate the band 12 a preselected distance above the surface of the pipe P. A coupling (not shown) is provided on each end of the band so that the two ends can be joined to position the track about the exterior of a pipe as shown in the Miller Patent.

The carriage 10 includes a body comprised of two frames 14 and 15 pivotally connected by two pivot pins 16. This pivotal connection permits the carriage wheels to be engaged or disengaged from the track 11, as will be explained hereinafter. Each frame has an outer downwardly extending projection forming skirts 14s and 15s. Such skirts may provide means for attaching a work tool to the carriage as shown in FIG. 3. There is shown in phantom line a welding tool 17 attached to skirt 15s by means of bolt 18.

Means for mounting the carriage on the track for movement therealong are provided on the carriage 10 for engagement with the track 11. In the preferred carriage these comprise two pair of idler wheels 19, one wheel 19 being disposed at each of the four corners of the carriage. As shown most clearly in FIG. 3, each wheel 19 has rigidly attached at its lower end a circular disc or bushing 20 having a circumferential groove 21 therein. Grooves 21 are specifically provided to engage the opposed lateral edges of the track band 12 and roll along the lateral edges of the track as the carriage progresses around the pipe. The upwardly and downwardly facing annular shoulders 21a and 21b (FIG. 4) of the grooves 21 act to retain the carriage against radial displacement relative to the track 11. At the upper end of each wheel 19 is a ball bearing including ball race 23 on the wheel and race 24 on a tubular wheel housing 26 carried by the carriage with balls 25 disposed between the races. The ball bearing arrangement permits rotation of the wheels 19 and discs 20 relative to the carriage body, and carries vertical and horizontal loads. A cap 26a fits within the top of tubular wheel housing 26 to protect the bearings from contamination.

Each tubular wheel housing 26 has positioned around its lower end ball portion 27 which mates with socket 28 in the body frame sections 14 and 15. Formed on the upper end of each wheel housing 26 is an upstanding flange 29 having an arcuate slot 30 therein (FIG. 2). A bolt 31 fits through each slot 30 and a corresponding hole (not shown) in the body frame section and is held at its threaded end by nut 32 (FIG. 3).

This arrangement provides means whereby the wheels 19 may be adjusted arcuately in a plane perpendicular to the axis of pipe P so that the same carriage may be used on different diameter pipes. To adjust the wheels, nuts 32 are loosened so that flange 29 may move relative to the body frame. The wheels may then be pivoted by provision of balls and sockets 27 and 28 through an arc in the same plane as slots 30. The lower end of the wheels (mounting bushings 20) are pivoted toward each other to accommodate a smaller diameter pipe and away from each other to accommodate pipes of larger diameter. Once the adjustment is made, nuts 32 are retightened to lock the wheels in their new position.

Positive engagement of idler wheels 19 with the track band 12 is provided by two compression coil springs 33 (FIGS. 1 and 4). Each coil spring 33 has its lower end in circular recess 34 in a lateral rib of body frame 15, and its upper end bears against the under side of frame 14. Springs 33 tend to pivot the lower ends of the two body frames toward each other about pivot pin 16 in a direction urging the bushings 20 toward each other, and thereby serve to keep the grooves 21 of bushings 20 on wheels 19 engaged with the edges 22 of track band 12.

Means are also provided for overcoming the force of springs 33 when it is desired to release or re-engage the carriage 10. As best shown in FIGS. 1 and 4, each of the two laterally extending ribs of frame 14 has formed on its upper face tapering cam surface 35. Two elliptical cams 36 carried by frame 15 engage cam surfaces 35 and are joined by a shaft 37 having a handle 38. By depressing handle 38 in a counter-clockwise direction (as viewed in FIG. 4) elliptical cams 36 will engage and depress cam surfaces 35, causing frame 14 to pivot about pivot pins 16 in a clockwise direction relative to frame 15. This serves to disengage the two wheels 19 carried by frame 14 from the track band 12 so that the carriage may be removed from the track. The process is reversed to mount the carriage on the track; that is, the cam is first depressed, the carriage positioned on the track and the cam released to engage grooves 21 of bushings 20 with the track band.

In the prior art carriages of this type, as for example in the Miller Patent referred to above, the same grooved wheels which retain the carriage on the track are powered to drive the carriage therealong. Since both the track and wheels are made of steel, or some similar substance having a low coefficient of friction, it is necessary for the wheels to grip the track very tightly in order to generate sufficient friction to drive the carriage. This frequently has resulted in the track band being buckled or deformed due to the compressive force of the drive wheels. This problem is overcome in the carriage of the present invention by providing drive means on the carriage body for moving the carriage along the track, which drive means include friction means for direct engagement with a cylindrical surface parallel to the axis of the pipe.

The preferred form of this drive system is shown in FIGS. 1 and 5 through 8. It includes a drive body 39 in the form of a vertical plate with a dovetail slot 40 formed on the side adjacent the carriage 10 by two vertical ribs 39a and 39b. Slot 40 engages a corresponding dovetail slide 41 on frame 14 to retain the drive body against movement relative to the carriage in other than a vertical direction. A spacer busing 41a (FIG. 1) fits between slide 41 and rib 39b of drive body 39. Coiled tension springs 42 (FIG. 2) with their lower ends attached to body frame 14 and their upper ends to drive body 39 provide resilient means urging the drive body downwardly relative to the carriage. Attached to the upper end of drive body 39 by a pivot pin 43 is an elliptical cam 44 (FIG. 7) having an actuating handle 45 (FIG. 6). Cam 44 engages the upper edge 41a of slide 41 so that rotation of the elliptical cam 44 by handle 45 until its enlarged side is downward will move the drive body 39 upwardly relative to slide 41 and the carriage body.

Extending outwardly from the mid portion of drive body 39 on the side opposite ribs 39a and 39b is a drive sprocket 46 having multiple splines 46a. Disposed below and on either side of drive sprocket 46 are two pair of idler rollers including upper rollers 47 and lower rollers 48. Upper rollers 47 are smooth surfaced, while lower rollers 48 have splines 48a. As shown most clearly in FIGS. 6 and 8, the idler rollers are rotatably mounted in pairs on left-hand and right-hand roller brackets 49. Each roller bracket 49 has two pins 50 extending outwardly therefrom on which the idler rollers are mounted by means of ball bearings including ball races 51 and balls 52. The roller brackets 49 are themselves pivotally mounted on the drive body 39 by pivot pins 53. Each roller bracket 49 has an inwardly extending horizontal projection 49a. On the front end of each projection 49a is an upstanding tapered lug 49b around which is disposed a compression coil spring 54. The upper ends of the two springs 54 engage the lower side of spring retainer 55 mounted on the drive body 39 with screws 56. Coil springs 54 urge projections 49a of the roller brackets 49 downwardly, tending to pivot the left-hand roller bracket about its pivot pin 53 in a clockwise direction, and to pivot the right-hand roller bracket in a counter-clockwise direction, said springs 54 and roller brackets 49 comprise resilient tensioning means the purpose of which is to keep the preferred friction driving means tensioned as explained hereinafter.

Friction means for driving the carriage are provided by a flexible endless drive belt 57 having splines 57a on its inner surface. As shown in FIG. 6, the belt extends around the drive sprocket 46 and idler rollers 48 and under the idler rollers 47. The splines 57a of the drive belt mesh with the splines of the drive sprocket and rollers 48 so that the belt 57 progresses at a predetermined ratio of the speed of drive sprocket 46. The pivoting action of the idler rollers under the urging of springs 54 serves to keep the drive belt taut while permitting sufficient flexibility for the belt to accommodate irregularities encountered on the pipe's surface.

Similarly, the drive body 39 and belt 57 are urged downwardly into driving engagement with the pipe by the action of tension springs 42 which urge the drive body downwardly relative to the carriage 10. Cam 44 on the drive body may be used to lift the drive body and with it the drive belt 57, into a raised position where it does not engage the pipe P.

The outer surface of the pipe P and the upper and lower surfaces of the track band 12 provide cylindrical surfaces parallel to the axis of the pipe P off which the carriage may be driven without tending to buckle the track as in the prior art carriage; and frictional drive means driving off any of said surfaces are included within the scope of the present invention and the appended claims.

Power means for driving sprocket 46 to move the friction means 57 are preferably provided by an electric motor 58 carried by the drive body 39 (FIG. 3), which motor drives the sprocket 46 through a gear box 59. A hand-powered crank, or other suitable power means, could be used in lieu of the electric motor 58.

In operation, the carriage is mounted on the track as previously described, and the motor started to drive the belt 57. As the carriage moves around the track, a tool carried by the carriage, such as a cutting torch or welding apparatus, will be able to perform work on the pipe such as cutting, beveling or welding.

It is therefore seen that a pipe working carriage is provided in accordance with the objects of the present invention, which carriage has an improved drive mechanism which drives off a cylindrical surface parallel to the axis of the pipe rather than off the edges of the track band 12 as in the prior art carriage.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. A pipe working carriage for use with a track encircling the exterior of a pipe comprising:
   a body;
   means on the body for mounting the carriage on said track for movement therealong,
   said mounting means comprising grooved idler wheels for engagement with the edges of said track, and;
   means on the body for driving the carriage along the track including
   means for frictionally engaging a cylindrical surface parallel to the axis of the pipe, and
   means for moving said engaging means relative to said surface.

2. The carriage according to claim 1 including resilient means on said body for retaining said grooves in engagement with said track.

3. The carriage according to claim 1 wherein means are provided for adjusting the idler wheels arcuately in a plane perpendicular to the axis of said pipe whereby said carriage may be used in connection with different diameter pipes.

4. A pipe working carriage for use with a track encircling the exterior of a pipe comprising
   a carriage body;
   means for engaging said body with said track for movement around the track;
   means for attaching to the body a tool for doing work on the pipe;
   drive means on the body for moving the carriage along the track including,
   a drive body carried by said carriage body,
   rollers on said drive body,
   an endless belt disposed about said rollers and adapted to engage the external surface of said pipe, and
   means for driving one of said rollers to drive said belt.

5. The carriage according to claim 4 wherein resilient tensioning means are provided on said drive body for maintaining tension in said endless belt.

6. The carriage of claim 4 wherein resilient means are provided on said carriage body for urging said drive body downwardly relative to said carriage body.

7. A pipe working carriage for use with a track encircling the exterior of a pipe comprising
   a carriage body formed of two frames pivotally connected;
   idler wheels on said body adapted to engage said track to support said carriage body for movement around said pipe;
   means for attaching to the body a tool for doing work on the pipe;
   drive means on the body for moving the carriage along the track including,
   a drive body mounted on said carriage body,
   a drive sprocket on said drive body,
   idler rollers on said drive body,
   an endless drive belt disposed about said drive sprocket and idler rollers and adapted to engage the exterior of said pipe, and
   power means for driving said drive sprocket to drive said drive belt.

8. The carriage according to claim 7 wherein each of said idler wheels includes a circular groove for engagement with the lateral edges of said track.

9. The carriage according to claim 8 wherein said body includes resilient means for urging said circular grooves into engagement with said track.

10. The carriage according to claim 9 wherein said body includes means for overcoming the effect of said resilient means to facilitate engaging and disengaging said circular grooves on said idler wheels with said track.

11. The carriage according to claim 7 wherein said idler wheels are arcuately adjustable to accommodate pipes of different diameter.

12. The carriage according to claim 7 wherein said drive body is slidably mounted on said carriage body for movement in a vertical direction and includes means for resiliently urging said drive body downwardly relative to said carriage body to hold said endless belt in driving engagement with the pipe.

* * * * *